United States Patent [19]

Lesage

[11] Patent Number: 5,634,565

[45] Date of Patent: Jun. 3, 1997

[54] METHOD FOR ANTICOLLISION METHOD AND APPARATUS FOR CRANES MOVABLE ON A COMMON PATH

[75] Inventor: Michel Lesage, Zoufftgen, France

[73] Assignee: Sollac, Puteaux, France

[21] Appl. No.: 375,674

[22] Filed: Jan. 20, 1995

[30] Foreign Application Priority Data

Jan. 24, 1994 [FR] France .................................. 94 00820

[51] Int. Cl.$^6$ .................................................. B66C 15/04
[52] U.S. Cl. .......................... 212/276; 104/301; 340/685; 340/903
[58] Field of Search ...................... 212/276; 246/167 D; 104/299, 301; 340/685, 903

[56] References Cited

U.S. PATENT DOCUMENTS

| | | | |
|---|---|---|---|
| 4,296,901 | 10/1981 | Perrott | 104/299 |
| 5,346,739 | 9/1994 | Curry | 212/276 |

FOREIGN PATENT DOCUMENTS

| | | | |
|---|---|---|---|
| 466217 | 1/1992 | European Pat. Off. | 246/167 D |
| 661250 | 7/1987 | Switzerland | 246/167 D |

Primary Examiner—Thomas J. Brahan
Attorney, Agent, or Firm—Laubscher & Laubscher

[57] ABSTRACT

To prevent a collision between first and second mobiles, such as travelling cranes, on a common movement path, a method implemented in the first mobile entails measuring a first distance between the first mobile and an origin in a fixed system of axes and a second distance between the first and second mobiles. The method comprises the steps of determining a first speed of the first mobile in the system of axes and a second speed of the first mobile relative to the second mobile in order to deduce a third speed of the second mobile in the system of axes, then of estimating a safety margin between the first and second mobiles, then of comparing the safety margin with a threshold to generate a collision risk factor, and finally of deciding on an action at drive motors of the first mobile as a function of the sign of the first, second and third speeds and the collision risk factor.

7 Claims, 8 Drawing Sheets

METHOD FOR ANTICOLLISION METHOD AND APPARATUS FOR CRANES MOVABLE ON A COMMON PATH

BACKGROUND OF THE INVENTION

1. Field of the Invention

The present invention concerns an anticollision method for motorized mobiles, such as travelling cranes, movable autonomously relative to each other on a common movement path. The present invention also concerns an anticollision device for implementing the method.

2. Description of the Prior Art

In the prior art, travelling cranes moving on the same movement path are conventionally protected by electrical end-of-travel means which delimit the travel of the travelling cranes at each end of the movement path, and by mechanical end-of-travel means or buffers to guard against failure of the electrical means. Also, an anticollision system including a proximity detector is fitted to the travelling cranes to impose a minimal distance between two travelling cranes. This type of anticollision system merely estimates the relative distance between two travelling cranes, and not their relative speeds, which in practise causes unnecessary alarms to be given and the travelling cranes to be stopped unnecessarily, for example when two travelling cranes are close together but are moving in the same direction at substantially the same speed, or when one travelling crane is moving slowly towards the other.

OBJECT OF THE INVENTION

The main object of this invention is to overcome the drawbacks of the prior art by providing an anticollision device and method for a mobile, such as a travelling crane, which evaluate not only the movement of the mobile relative to a fixed system of axes but also the movement of the mobile relative to a directly facing adjacent mobile on the movement path.

SUMMARY OF THE INVENTION

Accordingly, a method of preventing collisions between two first and second mobiles which are movable on a common movement path, is implemented in the first mobile and comprises the following steps of:

measuring a first distance between the first mobile and an origin of a predetermined fixed system of axes and a second distance between the first mobile and the second mobile, determining a first speed of the first mobile in the fixed system of axes and a second speed of the first mobile relative to the second mobile as a function of the first distance and second distance in order to derive therefrom a third speed of the second mobile in the fixed system of axes, estimating a first safety margin between the first mobile and second mobile as a function of the second distance and first speed and third speed, comparing the first safety margin to at least a first predetermined threshold in order to produce a first collision risk factor, and deciding an action to be taken at drive means of the first mobile as a function of a sign of at least one of the first speed, second speed and third speed and as a function of the first collision risk factor in order to prevent a collision between the first mobile and second mobile.

The estimation step advantageously takes into consideration decelerations of the mobiles whose variations have been established experimentally. In accordance with the invention, the step of estimating comprises the sub-steps of calculation of a first stopping distance of the first mobile as a function of the first speed and a predetermined deceleration of the first mobile, and of a second stopping distance of second mobile as a function of the third speed and of a predetermined deceleration of the second mobile, and of calculation of the first safety margin as a function of the second distance and the first and second stopping distances.

To remedy to any measurement defect or any defect in determining any variable relevant to the decision-making process, the method preferably includes a coherence checking step relating to a variable equal to one of the first and second distances and the first and second speeds. The coherence checking step comprises the following sub-steps of:

carrying out at least one of first and second comparisons, the first comparison consisting in comparing the absolute value of the variable to a maximal value and the second comparison consisting in comparing a variable value difference between the variable and an earlier value of the variable with a minimal difference and a maximal difference, if the absolute value of the variable is less than the maximal value and the variable value difference lies between the minimal and maximal differences, incrementing a coherence count by one and deeming the variable to be coherent in subsequent steps of the method, a defect count being reset to zero if the coherence count is more than a minimal coherence count, if the absolute value of the variable is more than the maximal value or the variable value difference is less than the minimal difference or more than the maximal difference, incrementing the defect count by one and resetting the coherence count to zero, comparing the defect count to a maximal defect count in order to acquire the variable again if the defect count is less than the maximal defect count, and actuating the drive means if the defect count is more than the maximal defect count.

The invention also applies when the second mobile is replaced by a fixed obstacle at one end of the movement path.

The invention also applies when the first mobile is located between the second mobile and a third mobile which is movable on the movement path on the opposite side of the first mobile relative to the second mobile. Then, the method further comprises the steps of measuring a third distance between the first and third mobiles, determining a fourth speed of the first mobile relative to the third mobile as a function of the first and third distances, in order to derive therefrom a fifth speed of the third mobile in the fixed system of axes, estimating a second safety margin between the first mobile and third mobile as a function of the third distance and the first and fifth speeds, and comparing the second safety margin to at least one second predetermined threshold in order to produce a second collision risk factor. The step of action decision further depends of the fourth and fifth speeds and the second collision risk factor.

Furthermore, an anticollision device comprising relative to the first mobile:

a first distance measuring means for measuring the first distance between the first mobile and the origin of the predetermined fixed system of axes, a second distance measuring means for measuring at least the second distance between the first and second mobiles, and a central processing means connected to the first and second distance measuring means and to the drive means of the first mobile to implement the anticollision method according to the invention.

The first distance measuring means comprises preferably a laser rangefinder fixed to the first mobile and a reflector facing the rangefinder and fixed with respect to the fixed system of axes.

The second distance measuring means comprises preferably a laser rangefinder fixed to the first mobile and a reflector facing the rangefinder fixed to the second mobile.

The anticollision method and device embodying the invention are particularly advantageous for an installation including at least two mobiles moving on the same movement path. However, they can also be used if the installation includes only one mobile, for example to prevent collisions with obstacles on the running track of the mobile.

BRIEF DESCRIPTION OF THE DRAWINGS

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

Figure 1:
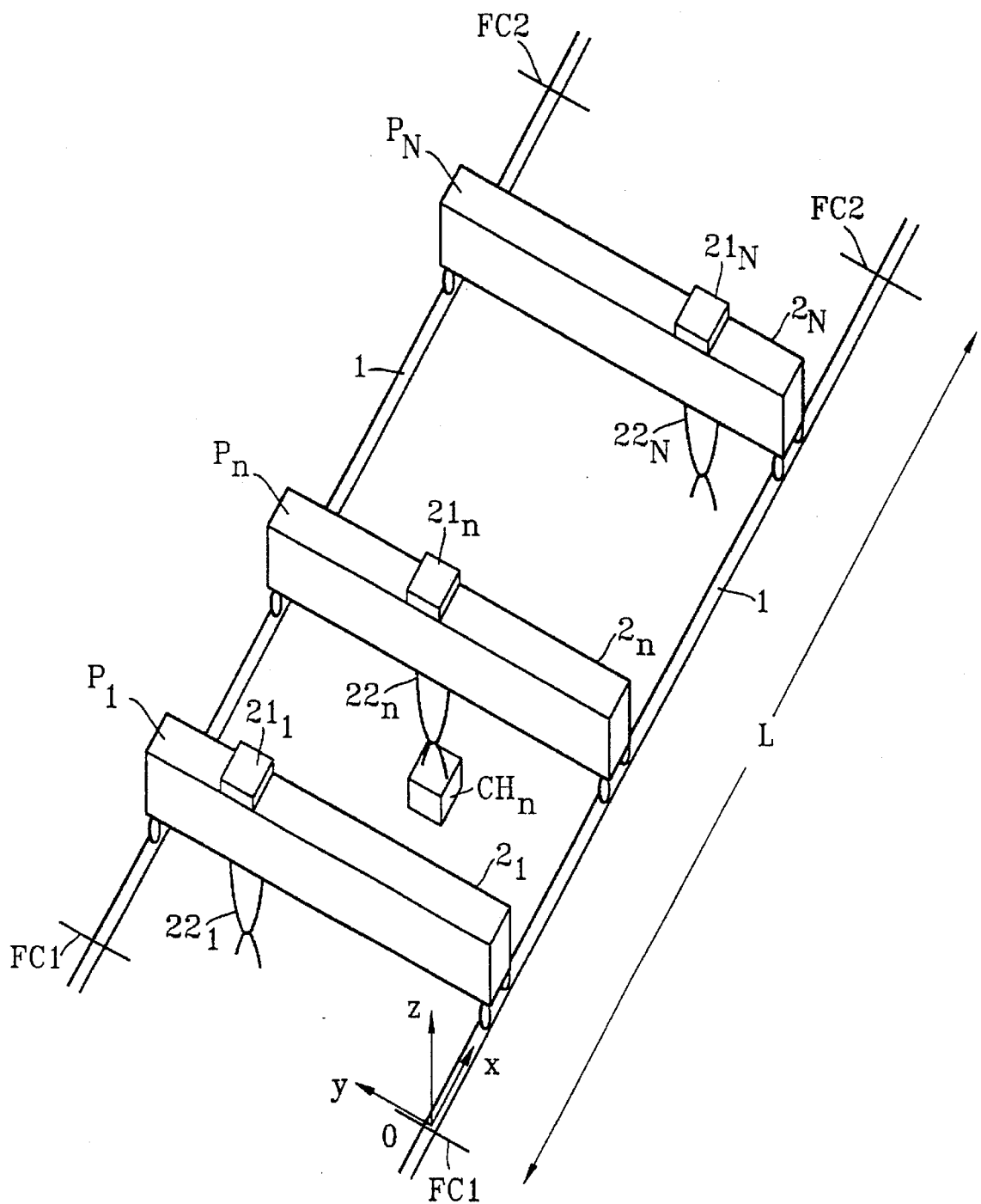
FIG. 1 is a perspective view of a travelling overhead travelling crane installation.

Referring to FIG. 1, a travelling crane installation for moving and transporting loads comprises N travelling overhead travelling cranes $P_1$ through $P_N$ moving on the same running track, where N is an integer typically with a value of 2, 3 or 4. The embodiment illustrated includes N=3 travelling cranes, for example. The travelling cranes are travelling overhead cranes which travel on the tops of parallel running rails 1. The running rails define the movement path of the travelling cranes which is conventionally delimited at both ends by electrical end-of-travel means FC1 and FC2 and mechanical end-of-travel means (not shown). A travelling crane $P_n$, where $1 \leq n \leq N$, includes at least one beam $2_n$ provided with a support at each end guided by driven or idler rollers and drive rollers for contact with and guidance by the running rails 1. The drive rollers are driven by electric motors $MO_n$, preferably at an electronically regulated variable speed, or alternatively by asynchronous motors at two different speeds at least. A carriage $21_n$ is movable longitudinally on the beam $2_n$ and carries a hoist $22_n$ for lifting the load. The carriage is motorized and the hoist is an electric cable or chain hoist or a pneumatic hoist.

Alternatively, the travelling crane $P_n$ is a travelling overhead crane of the suspended type, or a gantry travelling crane moving on two rails fixed to the ground, or a half-gantry travelling crane moving on a rail laid on the ground on one side and an overhead rail on the other side.

In all cases the travelling crane $P_n$ moves a load $CH_n$ by combinations of three movements:

vertical movement, called as lifting movement, longitudinal movement along the travelling crane, i.e. movement in the direction transverse to the rails, known as directional movement, and longitudinal displacement along the rails, known as translation movement.

The movement of the load $CH_n$ is controlled by an operator, called as crane driver, that uses a control panel which is either a unit connected to the crane by a cable or a control panel in a cab located on the crane or at a fixed location. The operator controls the motors driving the hoist $22_n$, the carriage $21_n$ and the beam $2_n$ to move the load $CH_n$ as a function of a required path.

The travelling cranes of the installation are not necessarily identical and can differ in terms of their mechanical structures or in terms of their drive and control The remainder of this description concerns only the translation movement, i.e. the movement of the travelling cranes along the running track. The first travelling crane $P_1$ moves between the travelling crane $P_2$ and the first end of the running track defined by the first electrical end-of-travel means FC1; the last travelling crane $P_N$ moves between the travelling crane $P_{N-1}$ and the second end of the running track defined by the second electrical end-of-travel means FC2; if N is at least equal to 3, the crane $P_n$, where $1<n<N$, moves between the two adjacent cranes $P_{n-1}$ and $P_{n+1}$. A fixed system of axes OXYZ defined relative to the running track, for example, is associated with the installation for identifying the position of each travelling crane. The system of axes has an origin O situated at the first end of the crane running track indicated by the first end-of-travel means FC1, and an X axis colinear with one of the running rails 1 and therefore parallel to the translation movement.

To illustrate the idea, the running track for the travelling cranes has a total length L of a few hundred meters between the first and second end-of-travel means FC1 and FC2, and the cranes have a span of a few tens of meters along the axis Y parallel to their beam, corresponding to the distance between the running rails 1.

Figure 2:
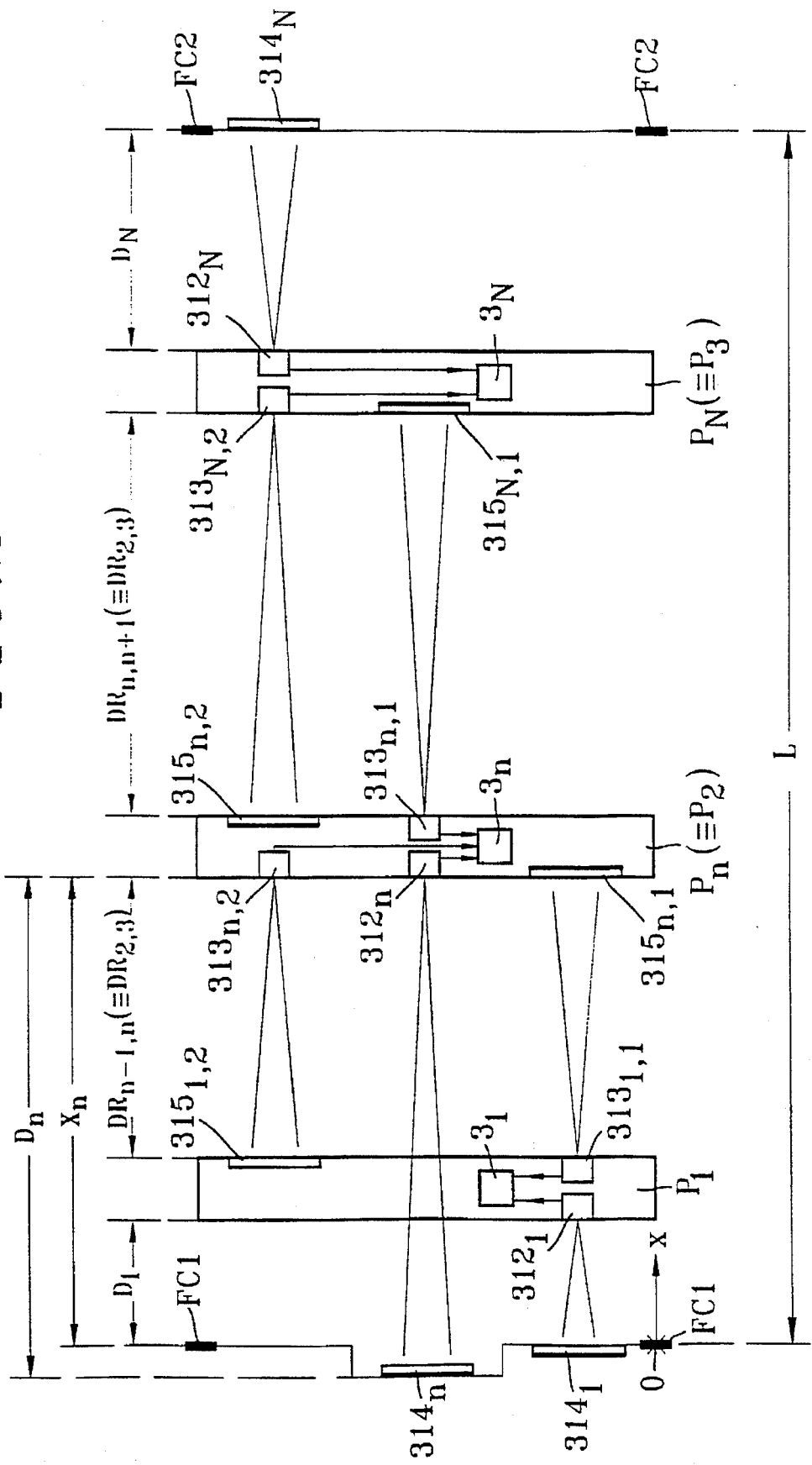
FIG. 2 is a plan view of a travelling overhead travelling crane installation equipped with anticollision devices of the invention.
Figure 3:
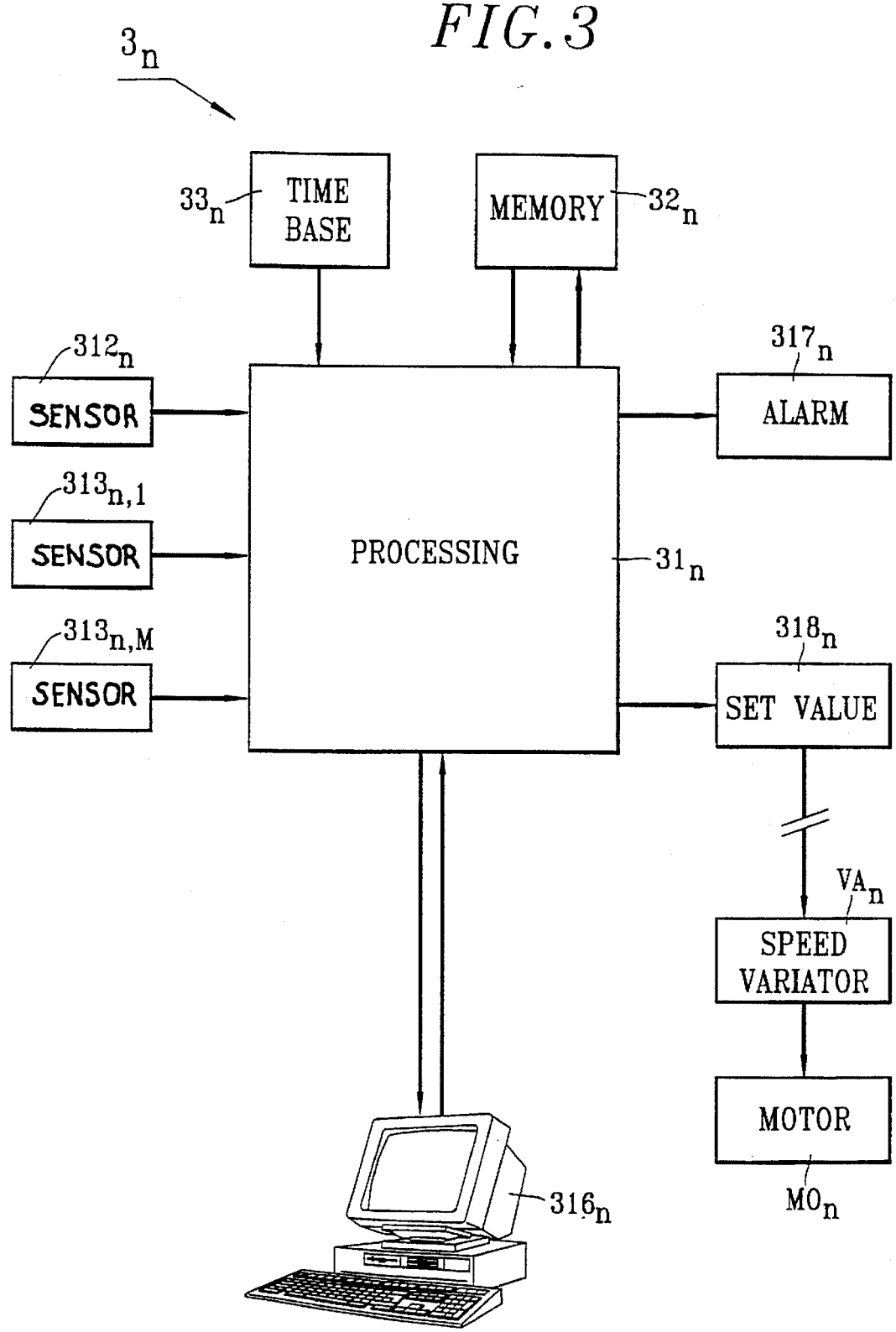
FIG. 3 is a schematic block diagram of an anticollision device of the invention.

Referring to FIGS. 2 and 3, an anticollision device $3_n$ is associated with the travelling crane $P_n$. Each crane $P_1$ through $P_N$ is preferably equipped with a device $3_1$ through $3_N$; in a simpler embodiment of the invention at least one of the travelling cranes $P_1$ through $P_N$ is so equipped. In all cases the anticollision device $3_n$ of the travelling crane $P_n$ is autonomous and independent of anticollision devices equipping other travelling cranes of the installation, both in structure and in implementation, as this improves the installation safety. Should one of the anticollision devices fail, the installation can continue to function in a degraded mode of operation without propagation of the failure leading to total immobilization of the installation.

The anticollision device $3_n$ includes a processing unit $31_n$ and a memory $32_n$ in a module fixed to the travelling crane $P_n$. An anticollision algorithm described below and configuration parameters of the algorithm which are explained in the description of the algorithm are stored in the memory $32_n$. The processing unit $31_n$ has analog and digital input/output ports to which can be connected distance and/or speed sensors $312_n$ and $313_{n,1}$ through $313_{n,M}$ of the travelling crane $3_n$, crane driver interface means $316_n$ and action means $317_n$–$318_n$. A time base $33_n$ synchronizes input/output and processing as described below. In an alternative embodiment, a sway sensor is also connected to the processing unit $31_n$. The sway sensor is fixed to the lower end of the hoist $22_n$ to measure swaying of the load $CH_n$ during movement. The distance sensors associated with the travelling crane $P_n$ are preferably of the non-contact type, preferably laser rangefinders $312_n$ and $313_{n,1}$ through $313_{n,M}$ where M is a positive integer not more than 2. A reflector $314_n$ or $315_{n\pm1,m}$ is mounted facing each rangefinder $312_n$ or $313_{n,m}$. The rangefinder $312_n$ or $313_{n,m}$ emits a pulsed mode beam of infrared light towards the reflector $314_n$ or $315_{n\pm1,m}$ facing it. The reflector reflects this light back to the rangefinder which measures the time between sending and receiving a pulse of the beam and deduces from this the distance between the rangefinder and the reflector. The emitted beam is slightly divergent so that the measurement is possible even if the travelling crane is not moving in a perfectly straight line, but with a slight "crabwise" motion due to slipping of the rollers on the running rails, for example. Laser rangefinders offer a measurement accuracy in the order of 5 millimeters and a range up to about 10 kilometers. Their response time is such that between 10 and 30 distance measurements can be carried out per second. The first rangefinder $312_n$ is associated with a reflector $314_n$ mounted on a fixed part of the installation, such as a wall of the building if the installation is inside a building. For example the first reflector $314_n$ is aligned with a vertical plane containing the end-of-travel means FC1 and the origin O of the system of axes OXYZ so that the first rangefinder measures the abscissa of the travelling crane $P_n$ in the fixed system of axes.

The second rangefinders $313_{n,1}$ and/or $313_{n,2}$ are associated with respective reflectors $315_{n+1,1}$ and/or $315_{n-1,2}$ mounted on the adjacent travelling crane(s) $P_{n+1}$ and/or $P_{n-1}$ and therefore measure the relative distances of the crane $P_n$ and the adjacent crane(s). Each end travelling crane $P_1$ or $P_N$ has a single second rangefinder $313_{1,1}$ or $313_{N,2}$ associated with a reflector $315_{2,1}$ or $315_{N-1,2}$ mounted on the adjacent travelling crane $P_2$ or $P_N$, i.e. a reflector $315_{n,1}$ or $315_{n,2}$ of the crane $P_n$ in the embodiment shown for which $P_n=P_2$ and $P_N=P_3$. If N is at most equal to 3, each intermediate travelling crane $P_n$, with 1<n<N, has two second rangefinders $313_{n,1}$ and $313_{n,2}$ associated with two reflectors $315_{n+1,1}$ and $315_{n-1,2}$ mounted on the two adjacent travelling cranes $P_{n+1}$ and $P_{n-1}$, one on each side of the intermediate travelling crane $P_n$.

The systems with rangefinder and reflector are preferably offset relative to each other in the direction Y parallel to the longitudinal axes of the cranes and also in height above the cranes so that the beams of the various rangefinders do not interfere with each other.

In an alternative embodiment the first rangefinder $312_n$ is replaced by less costly distance measuring means such as a pulse generator or by speed measuring means such as a tachogenerator. These devices are frequency available on existing travelling cranes, which reduces the cost of installing the anticollision device on existing cranes. The distance sensors used on a given travelling crane are not necessarily identical, and this applies also to the sensors used on the various travelling cranes of the installation.

The crane driver interface means $316_n$ comprise a screen and an alphanumeric keyboard, for example those of a computer which also has a memory for storing events relating to the travelling crane $P_n$. The action means comprise a visual or audible alarm device $317_n$, and/or means $318_n$, such as a digital-to-analog converter, for transmitting a speed set value to speed variators $VA_n$ controlling drive motors $MO_n$ in the supports of the travelling crane $P_n$ to move the crane. In an alternative embodiment the action means $317_n$–$318_n$ are means for displaying messages to the crane driver, on the screen of the computer $316_n$, for example, so that the crane driver operates motor controls particularly activating the speed variators.

Figure 4:
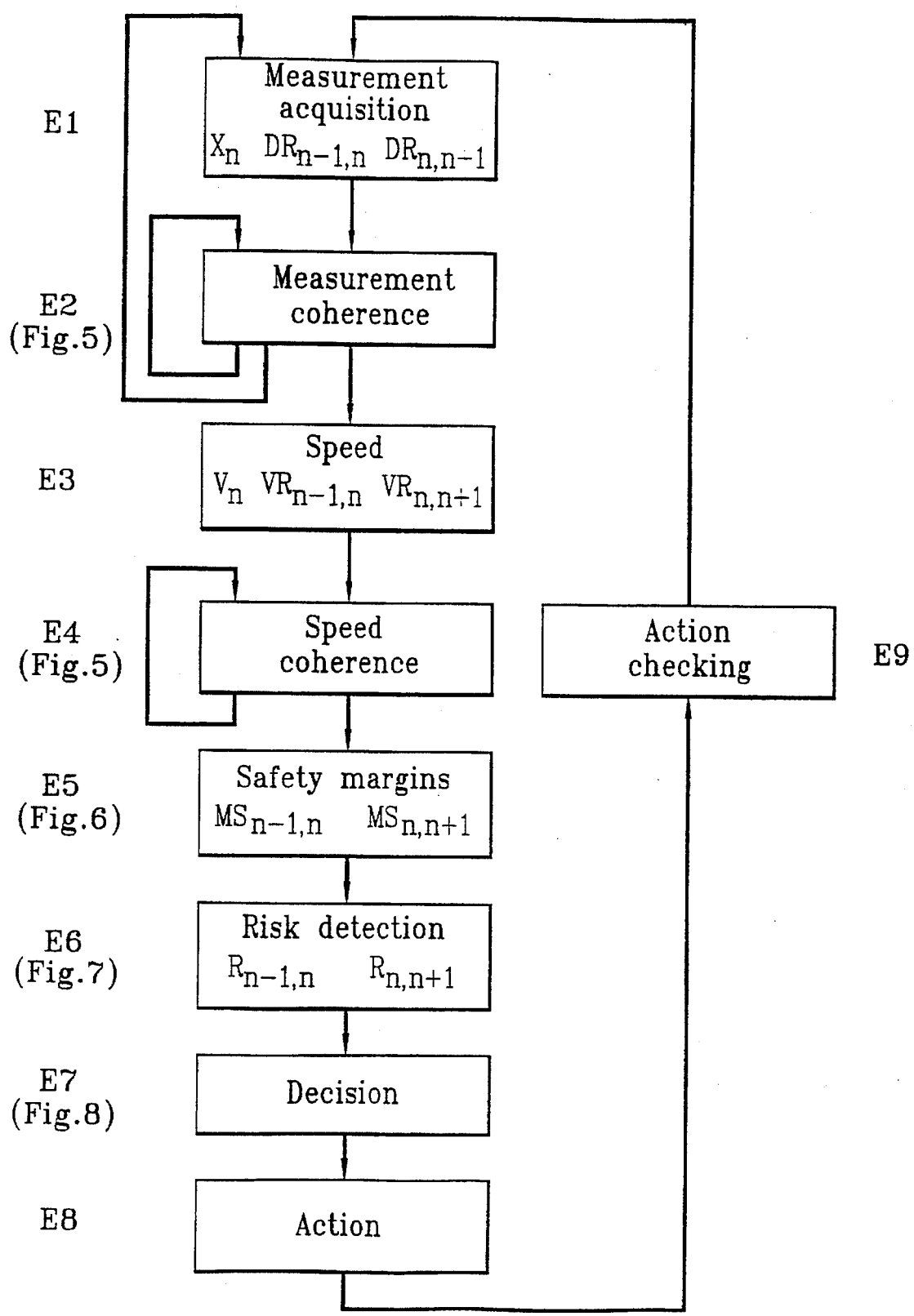
FIG. 4 is an anticollision flow chart of the invention.

Referring to FIG. 4, the anticollision algorithm stored in the memory $32_n$ of the anticollision device $3_n$ of the travelling crane $P_n$ comprises nine steps E1 through E9.

Step E1 is the acquisition of measurements by the distance sensors. If these are laser rangefinders as previously described, the distance sensors produce about 15 measurements per second. As shown in FIG. 2, for an intermediate travelling crane $P_n$ the measurements acquired are the distance $D_n$ of the travelling crane $P_n$ relative to the fixed reflector $314_n$ and the relative distances $DR_{n-1,n}$ and $DR_{n,n+1}$ of the travelling crane $P_n$ relative to the adjacent travelling cranes $P_{n-1}$ and $P_{n+1}$. In the case of an end travelling crane $P_1$ or $P_N$ the measurements acquires are the distance $D_1$ or $D_N$ and the position or relative distance $DR_{1,2}$ or $DR_{N-1,N}$ of the end travelling crane relative to the adjacent travelling crane $P_2$ or $P_{N-1}$. If the reflector $314_n$ does not have a zero abscissa in the fixed system of axes, as shown for the crane $P_n$ in FIG. 2, the distance $D_n$ is corrected to produce a corrected distance $X_n$ in the fixed system of axes by subtracting or adding the distance from the reflector to the origin O of the system of axes. The position of the travelling crane $P_n$ at a given time is then indicated by the corrected distance $X_n$ which is the abscissa of the travelling crane $P_n$ in the fixed system of axes.

If the first rangefinder $312_n$ of the travelling crane $P_n$ is replaced by a tachogenerator the measurement of the distance $D_n$ and the subsequent calculation of the corrected distance $X_n$ in the fixed system of axes are replaced by measurement of the speed $V_n$ of the travelling crane $P_n$.

Figure 5:
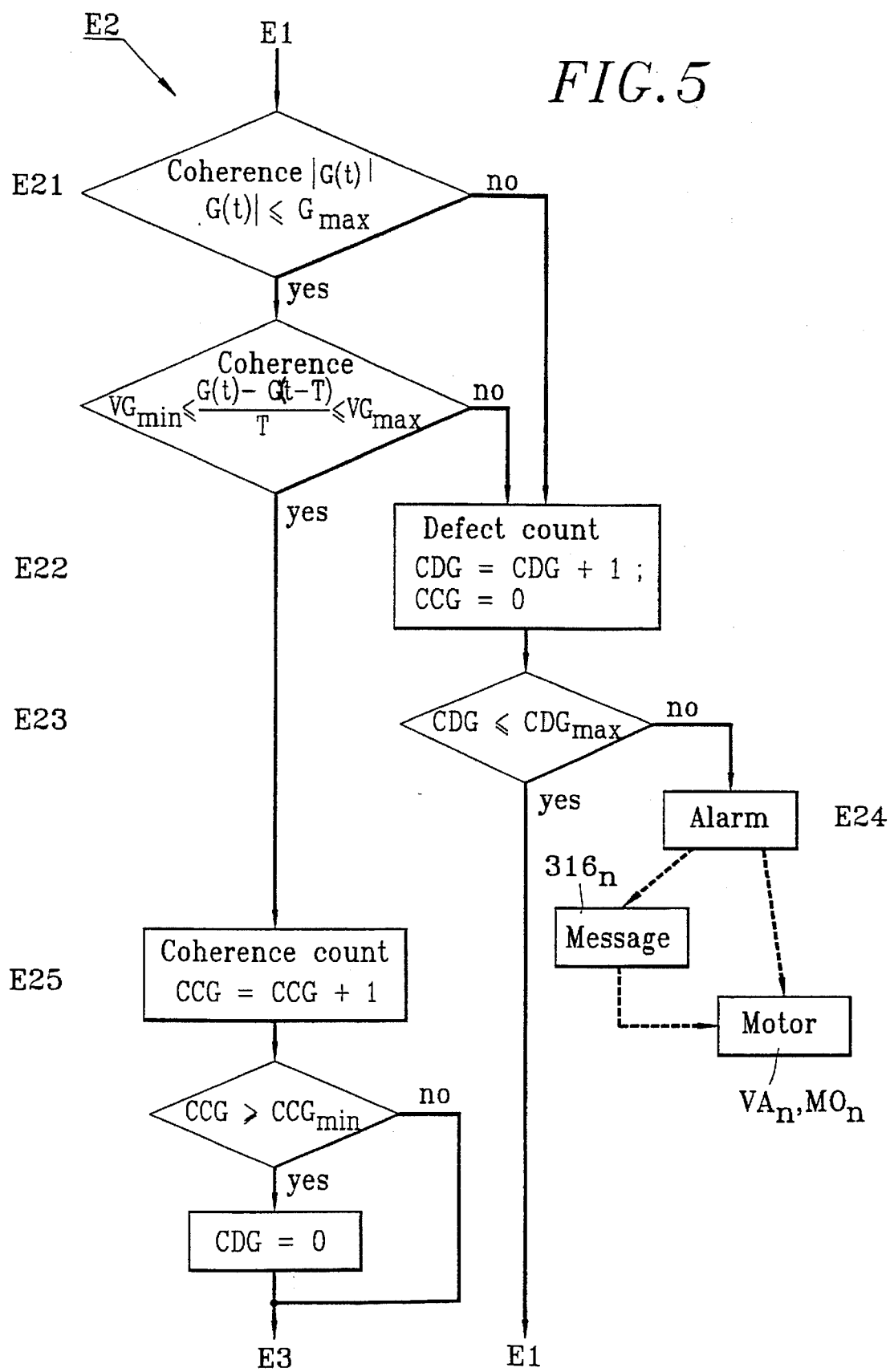
FIG. 5 is a coherence check flow chart of the invention.

Step E2 is a coherence check on the values measured in step E1. Step E2 is carried out sequentially with an acquisition period T of a few milliseconds defined by the time base $33_n$ and either successively or simultaneously in parallel for the measured values $X_n$ or $V_n$, $DR_{n-1,n}$ and/or $DR_{n,n+1}$. In FIG. 5 one of these values $X_n$, $V_n$, $DR_{n-1,n}$ or $DR_{n,n+1}$ is denoted G, and the measured value of G at time t is denoted G(t). The value G(t) measured at time t undergoes two coherence tests in step E21. The first coherence test concerns the absolute value of G(t) which is compared to a predetermined maximal value $G_{max}$. The second coherence test concerns the difference between G(t) and the value G(t-T) previously acquired at the time (t-T), which is compared to predetermined minimal and maximal differences $VG_{min}$ and $VG_{max}$.

If the results of both tests are positive, the measured value G(t) is deemed to be coherent and the algorithm proceeds to step E25 during which a coherence count CCG relating to consecutive coherent measurements G(t) is incremented by 1. The coherence count CCG is compared with a predetermined minimal coherence count $CCG_{min}$ to verify that the consecutive measured values G(t) are coherent over a significant number of values. If so, a defect counter CDG of measured values G(t) is reset to zero and the algorithm proceeds to step E3 described below. If the coherence count CCG is not greater than the minimal count $CCG_{min}$ the consecutive number of coherent measured values is insufficient, the defect counter is not reset and the algorithm proceeds to step E3.

If the result of one test in step E21 is negative the algorithm proceeds to step E22 in which the defect count CDG is incremented by 1 and the coherence count CCG is reset to zero. In step E23 the defect count CDG is compared to a maximal defect count $CDG_{max}$. If the count CDG is less than the maximal count $CDG_{max}$ the algorithm proceeds to measurement step E1 to acquire new measurements. If the defect count CDG exceeds the maximal count $CDG_{max}$ the measurements are incoherent and the algorithm proceeds to step E24 thereby displaying a warning message such as "abnormal speed measurement" on the display screen of computer $316_n$ for the crane driver who controls the crane speed variators $VA_n$ and the crane motors $MO_n$. In an alternative embodiment, in step E24 a visual and/or audible alarm is given, or a braking set value is transmitted to the crane motors $MO_n$.

Referring to FIG. 4 again, step E3 determines the drift the distances $X_n$ and $DR_{n-1,n}$ and/or $DR_{n,n+1}$ in respect of the time. The result of step E3 comprises "speeds" $V_n$ and $VR_{n-1,n}$ and/or $VR_{n,n+1}$, each speed having a positive or negative sign according to whether the respective differentiated distance is increasing or decreasing. Accordingly, the drifts of distances $X_1$ and $DR_{1,2}$ are calculated for the crane $P_1$; the drifts of distances $X_N$ and $DR_{N-1,N}$ are calculated for the crane $P_N$; and the drifts of distances $X_n$, $DR_{n-1,n}$ and $DR_{n,n+1}$ are calculated for all the cranes $P_n$, with $1<n<N$. The drifts are calculated on the basis of two consecutive measurements spaced by the sampling period T; alternatively a slope calculation over a predetermined time interval is performed. If the first distance sensor is replaced by a tachogenerator, the speed $V_n$ is not calculated in step E3 because the speed $V_n$ is measured in step E1.

Step E4 is a coherence check on the calculated speeds $V_n$, $VR_{n-1,n}$ and/or $VR_{n,n+1}$. The coherence check is carried out for each calculated value, in a manner similar to that described with reference to FIG. 5.

Step E5 determines two safety margins $MS_{n-1,n}$ and $MS_{n,n+1}$ for the travelling crane $P_n$. The two safety margins $MS_{n-1,n}$ and $MS_{n,n+1}$ are respectively calculated lengths in opposite directions from the travelling crane $P_n$. For the travelling crane $P_1$ the margin $MS_{0,1}$ lies between the first end of the running track and the travelling crane $P_1$ and the safety margin $MS_{1,2}$ lies between the travelling cranes $P_1$ and $P_2$. For the travelling crane $P_N$ the safety margin $MS_{N-1,N}$ lies between the travelling cranes $P_{N-1}$ and $P_N$ and the safety margin $MS_{N,N+1}$ lies between the travelling crane $P_N$ and the second end of the track. Finally, if N is at least equal to 3, for an intermediate travelling crane $P_n$, with $1<n<N$, the safety margins $MS_{n-1,n}$ and $MS_{n,n+1}$ lie between the travelling cranes $P_n$ and $P_{n-1}$ and the travelling cranes $P_n$ and $P_{n+1}$, respectively.

Figure 6:
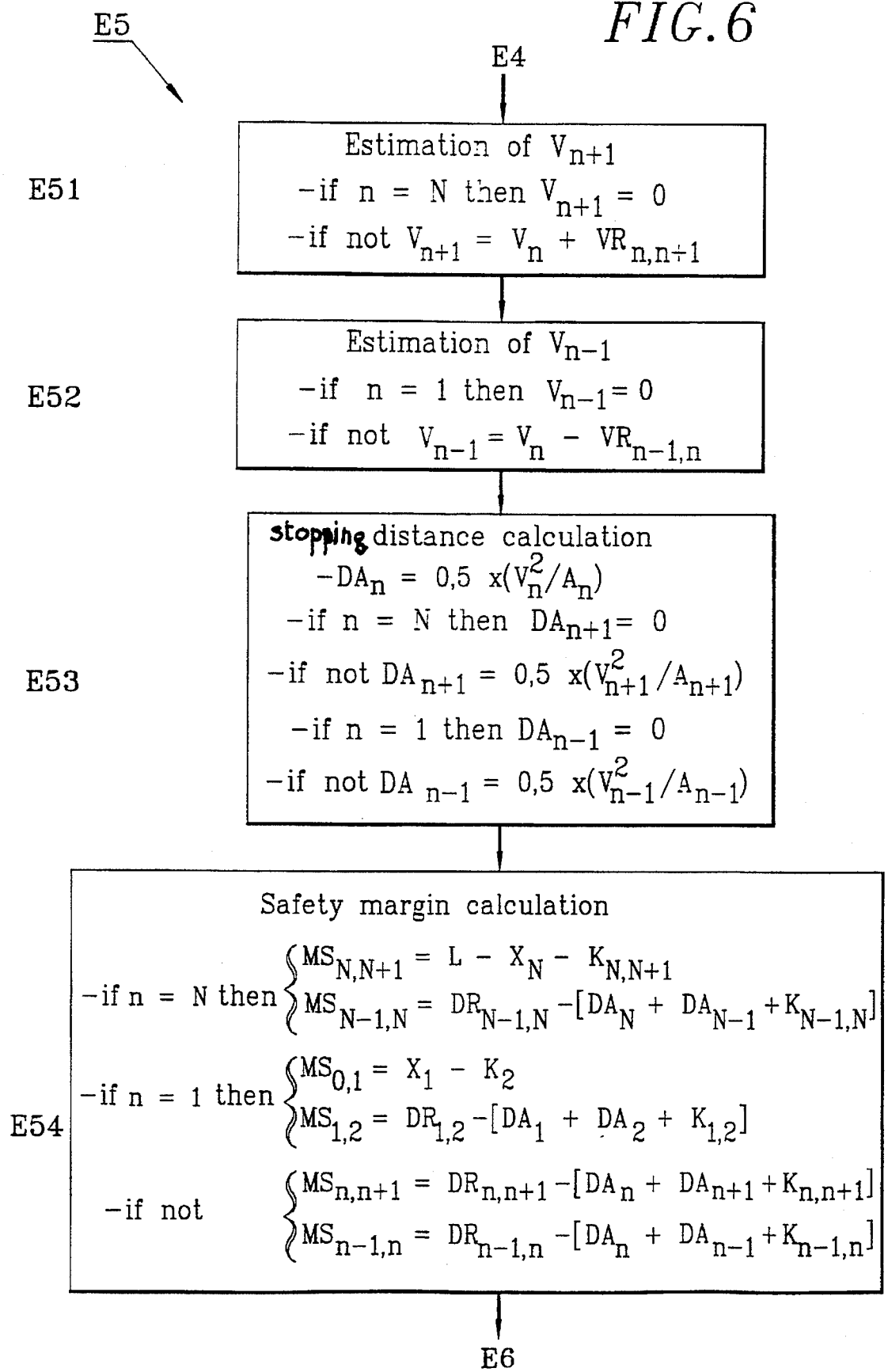
FIG. 6 is a safe distance calculation flow chart of the invention.

Referring to FIG. 6, step E5 comprises four sub-steps E51 through E54. Sub-step E51 is the estimation of the speed $V_{n+1}$ of the crane $P_{n+1}$ from the speeds $V_n$ and $VR_{n,n+1}$ previously determined in step E3. For n=N, the speed $V_{N+1}$ is zero because there is no crane $P_{N+1}$. In all other cases, with $1<n<N$, the speed $V_{n+1}$ is equal to $V_n+VR_{n,n+1}$.

Similarly, in sub-step E52, the speed $V_{n-1}$ of the crane $P_{n-1}$ is estimated on the basis of the speeds $V_n$ and $VR_{n-1,n}$ previously determined in step E3. For n=1 the speed $V_0$ is zero because there is no crane $P_0$. In other cases with $1<n\leq N$ the speed $V_{n-1}$ is equal to $V_n-VR_{n-1,n}$.

Sub-step E53 is the calculation of stopping distances $DA_n$, $DA_{n+1}$ and/or $DA_{n-1}$ of the travelling cranes $P_n$, $P_{n+1}$ and/or $P_{n-1}$ respectively according to the speed $V_n$ calculated in step E3 and the speeds $V_{n+1}$ and/or $V_{n-1}$ estimated in sub-steps E51 and/or E52. The stopping distances $DA_n$, $DA_{n+1}$ and/or $DA_{n-1}$ are the distances travelled by the travelling cranes $P_n$, $P_{n+1}$ and/or $P_{n-1}$ between the time 5 at which their speeds are $V_n$, $V_{n+1}$ and/or $V_{n-1}$ and the time at which their speeds are zero. In a first embodiment the decelerations of the travelling cranes $P_n$, $P_{n+1}$ and/or $P_{n-1}$ are constant and have the respective values $A_n$, $A_{n+1}$ and/or $A_{n-1}$. The speeds are linear functions of time and cancel out at respective times $t_n=V_n/A_n$, $t_{n+1}=V_{n+1}/A_{n+1}$ and $t_{n-1}=V_{n-1}/A_{n-1}$. At these times the distances travelled are $DA_n=0.5\times(V_n^2/A_n)$, $DA_{n+1}=0.5\times(V_{n+1}^2/A_{n+1})$ and $DA_{n-1}=0.5\times(V_{n-1}^2/A_{n-1})$.

In a second embodiment the deceleration of each travelling crane depends on the crane speed in accordance with a law established experimentally. For example, the deceleration is constant in each of several speed ranges or varies linearly with speed.

As with the estimation of the speeds $V_{n+1}$ and $V_{n-1}$ in sub-steps E51 and E52, the calculation of the stopping distances allows for specific cases in which n=1 and n=N. If n=1 the stopping distance $DA_{n-1}$ is zero; likewise, if n=N the stopping distance $DA_{n+1}$ is zero.

Sub-step E54 determines the safety margins $MS_{n,n+1}$ and $MS_{n-1,n}$ according to the relative distances $DR_{n,n+1}$ and $DR_{n-1,n}$ measured in step E1 and the stopping distances previously calculated in sub-step E53. A respective defect coefficient $K_{n,n+1}$, $K_{n-1,n}$ allows for the calculation time between measurements (step E1) and action (step E7), uncertainty affecting the measurements, and a safety factor.

The coefficients $K_{n,n+1}$ and $K_{n-1,n}$ are determined from an experimental knowledge of the behavior of the travelling cranes. $P_n$ and $P_{n+1}$, and $P_n$ and $P_{n-1}$, respectively.

The calculation of the safety margins differs according whether the travelling crane $P_n$ is an end crane or an intermediate crane.

If $1<n<N$, the safety margins are:

$$MS_{n,n+1}=DR_{n,n+1}-[DA_n+DA_{n+1}+K_{n,n+1}]$$

$$MS_{n-1,n}=DR_{n-1,n}-[DA_n+DA_{n-1}+K_{n-1,n}].$$

If n=N, then $MS_{N-1,N}$ is calculated from the appropriate formula above and $$MS_{N,N+1}=L-X_N-K_{N,N+1},$$

where L is the total length between the end-of-travel means.

If n=1, then $MS_{1,2}$ is calculated from the appropriate formula above and $$MS_{0,1}=X_1-K_{0,1}.$$

Figure 7:
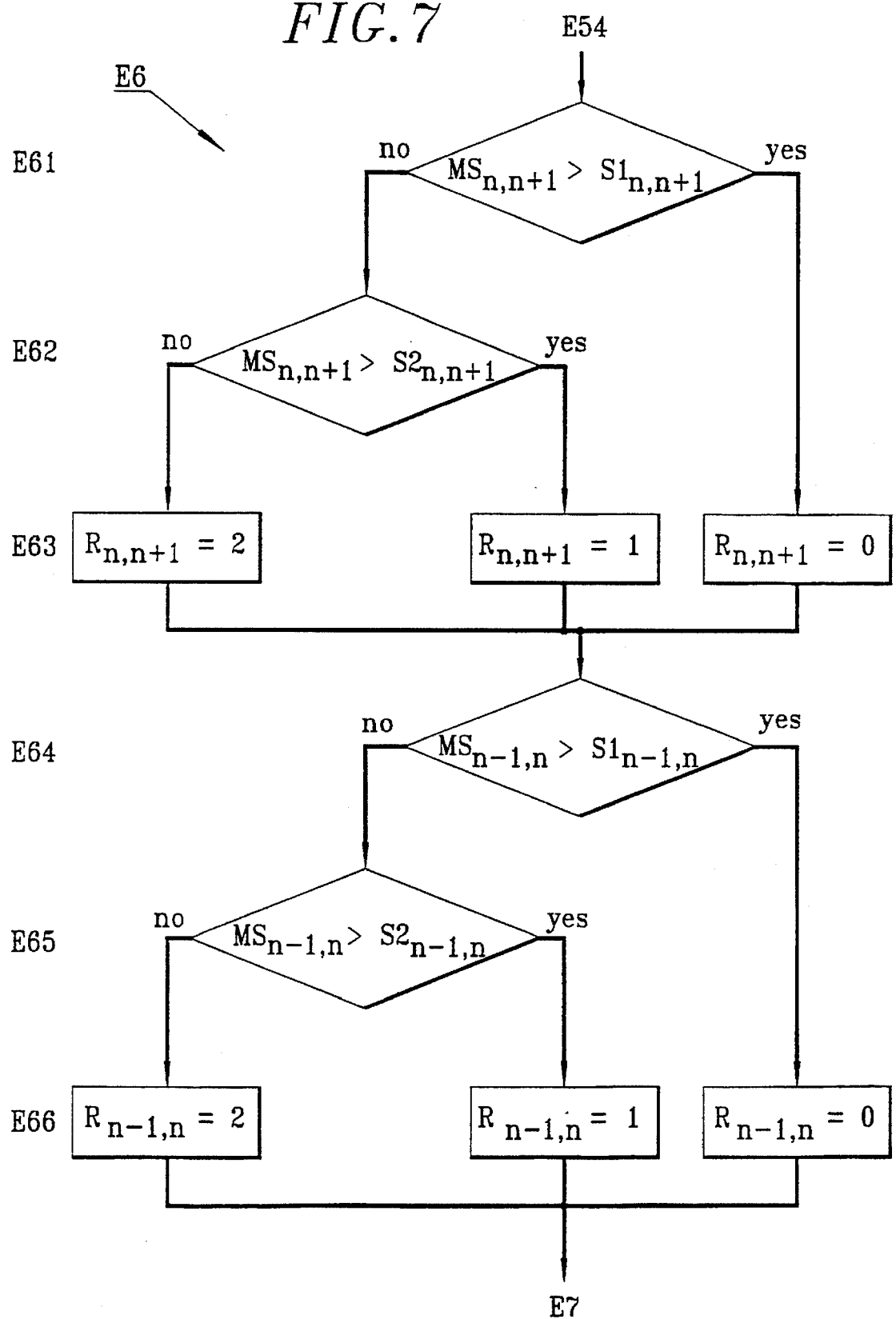
FIG. 7 is a collision risk evaluation flow chart of the invention.

Referring to FIG. 4 again, the risk detection step E6 consists in comparing the safety margins calculated in step E5 to predetermined thresholds which define areas each of which is assigned a predetermined risk. In the implementation shown in FIG. 7, step E6 comprises six sub-steps E61 through E66 during which each of the safety margins $MS_{n,n+1}$ and $MS_{n-1,n}$ is compared to two respective thresholds which define three areas on a respective side of the travelling crane $P_n$.

In sub-step E61 the safety margin $MS_{n,n+1}$ is compared to a first threshold $S1_{n,n+1}$. This threshold $S1_{n,n+1}$ is a pre-alarm distance which defines two areas in front of the travelling crane $P_n$, between the travelling crane $P_n$ and $P_{n+1}$. If the safety margin $MS_{n,n+1}$ is more than the threshold $S1_{n,n+1}$, then there is no risk of the crane $P_n$ colliding with the next crane $P_{n+1}$ and in sub-step E63 a risk factor $R_{n,n+1}$ which is a three-state logic variable is initialized to zero. There is conceivably a risk of collision between the cranes $P_n$ and $P_{n+1}$ if the safety margin $MS_{n,n+1}$ is less than the threshold $S1_{n,n+1}$ and in sub-step E62 the safety margin $MS_{n,n+1}$ is compared to a second threshold $S2_{n,n+1}$ lower than the first threshold $S1_{n,n+1}$. If the safety margin $MS_{n,n+1}$ is more than the second threshold $S2_{n,n+1}$, the travelling crane $P_n$ is in a risk area and the risk factor $R_{n,n+1}$ is initialized to 1 in sub-step E63.

If the safety margin $MS_{n,n+1}$ is less than the second threshold $S2_{n,n+1}$, the travelling crane $P_n$ is in a high-risk collision area and the risk factor $R_{n,n+1}$ then has the value 2 in sub-step E63.

In sub-steps E64 through E66 the safety margin $MS_{n-1,n}$ is compared to two predetermined thresholds $S1_{n-1,n}$ and $S2_{n-1,n}$ in a similar manner to sub-steps E61 through E63. The result of sub-step E66 is a risk factor which is a three-state logical variable $R_{n-1,n}$ with the value 0, 1 or 2 according to the risk detected, i.e., according to whether the safety margin $MS_{n-1,n}$ is more than $S1_{n-1,n}$, lies between $S2_{n-1,n}$ and $S1_{n-1,n}$, or is less than $S2_{n-1,n}$.

The number of thresholds and consequently the number of areas and therefore the number of logic states of the risk factors $R_{n,n+1}$ and $R_{n-1,n}$ are chosen on the basis of experimental knowledge of the travelling crane $P_n$ and are not necessarily the same on each side of the crane $P_n$. In practise the number of areas on each of the sides of the crane $P_n$ is chosen between one and five.

Figure 8:
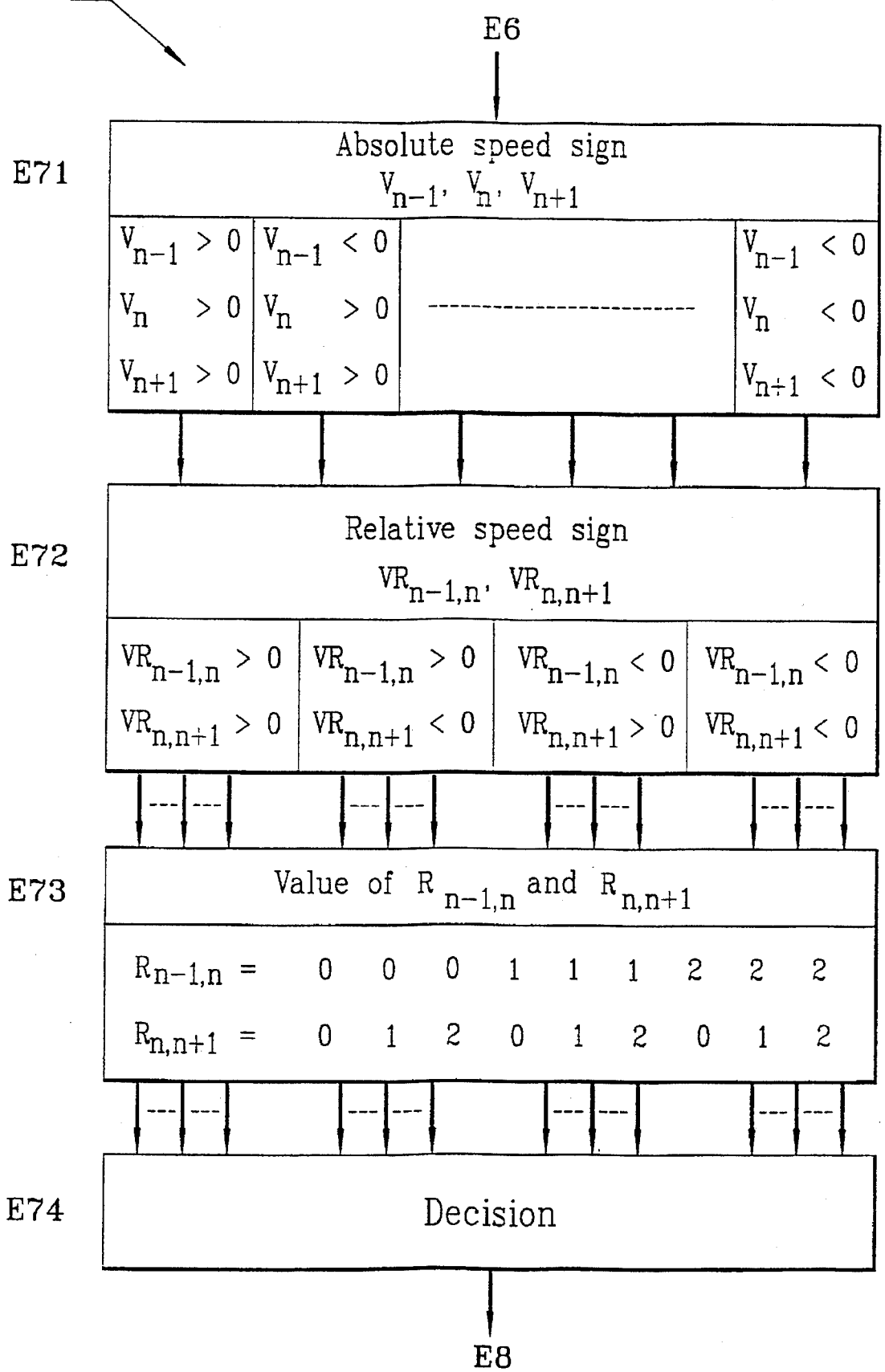
FIG. 8 is a decision flow chart of the invention.

Step E7 is the decision on an action to be taken in respect of control of the travelling crane $P_n$ as a function of the absolute speeds $V_{n-1}$, $V_n$ and $V_{n+1}$, the relative speeds $VR_{n-1,n}$ and $VR_{n,n+1}$ and the risk factors $R_{n,n+1}$ and $R_{n-1,n}$. As shown in FIG. 8, step E7 comprises four sub-steps E71 through. E74.

Sub-step E71 selects the combination of movement directions according to which the travelling crane $P_n$ travels relative to the adjacent travelling cranes and, where necessary, relative to the adjacent end of the running track, from $2^3=8$ first combinations in accordance with the signs of the three absolute speeds $V_{n-1}$, $V_n$ and $V_{n+1}$. The sign of each speed $V_n$, $V_{n-1}$or $V_{n+1}$ indicates the direction of movement of the travelling crane $P_n$, $P_{n-1}$ and/or $P_{n+1}$.

Sub-step E72 determines the moving-towards/moving-away-from combination in which travelling crane $P_n$ is relative to the running track end/adjacent travelling cranes according to the signs of the relative speeds $VR_{n-1,n}$ and $VR_{n,n+1}$. For each of the first combinations of sub-step E71 there are $2^2=4$ second combinations according to the signs of the relative speeds, so that there are a total of $2^3 \times 2^2=32$ sub-combinations.

Sub-step E73 divides the preceding 32 sub-combinations into $3^2 \times 3^2=288$ elementary combinations according to the values of the risk factors $R_{n,n+1}$ and $R_{n-1,n}$ if the latter are three-state logical variables. A predetermined action is associated with each of these elementary combinations.

Depending on which of the elementary combinations applies to the travelling crane $P_n$, step E74 chooses the associated action decision. For example, if $V_{n-1}>0$, $V_n>0$, $V_{n+1}>0$ and $R_{n-1,n}=0$, $R_{n,n+1}=2$, then the decision is to stop the travelling crane $P_n$.

The decisions are sent to the speed variator $VA_n$ either automatically via the transmitting means $318_n$ or semi-automatically via the crane driver crane interface constituted by the computer $316_n$. The possible decisions are particularly:

take no action,
slow down the travelling crane,
stop the travelling crane, and
speed up the travelling crane.

The decisions to speed up or slow down can be broken down into speeding up, respectively slowing down the travelling crane at $F \times V_n$ where the value of F is 1.1 or 1.2 or 0.9 or 0.8 or 0.7, for example, and the value of F is predetermined for each of the elementary combinations which entail action to speed up or slow down the travelling crane.

Step E8 executes the action decided on in step E7. This action is to transmit a speed set value to the speed variators $VA_n$ of the drive motors $MO_n$ of the travelling crane $P_n$, for example. Alternatively, the action is to display on the alphanumeric screen of the computer $316_n$ a message summarizing the decision taken in step E7. This message is then read by the crane driver who takes the decided indicated action. According to another alternative embodiment, audible and/or visual alarms are associated with the elementary combinations regarded as most dangerous, so that an alarm is given if the travelling crane finds itself in any of these dangerous elementary combinations. In the embodiment where a sway sensor is connected to the processing unit $31_n$, the sway information corrects the action decided on, for example by limiting acceleration if the load is swaying significantly.

Step E9 checks the action taken in step E8. If action is taken in step E8 it should have had an effect on the movement of the travelling crane $P_n$ after a predetermined time, typically a few seconds. For example, the action of braking should have reduced the speed, and the variation in the speed as a function of time, which depends among other things on the inertia of the travelling crane, is known experimentally. The checking is applied to the speed $V_n$ of the travelling crane $P_n$ and to the relative speeds $VR_{n-1,n}$ and $VR_{n,n+1}$ each of which is compared to a respective predetermined objective template. The checking of a given action is preprogrammed according to which of the elementary combinations causes the action to be taken.

After step E9 the algorithm loops to the measurement step E1.

The anticollision device and method of the invention offer great flexibility in use, in particular through their adaptation to the travelling crane with which they are associated, through their autonomy and their independence of other devices and methods which may be implemented on other travelling cranes of the installation, and through the facility of setting parameters of the set of elementary combinations.

The invention is described above with reference to travelling cranes. However, the method and the device of the invention apply to any type of mobile moving on a movement path common to the mobiles. These mobiles are for example harbour cranes or driverless electric carriages or tractors guided optically or by induction, or automated merchandise transfer systems moving horizontally and/or vertically in a warehouse.

What is claimed is:

1. A method for preventing collisions between first and second motor-driven movable cranes which are movable on a common movement path, comprising the steps of:

(a) measuring a first distance between said first crane and an origin of a predetermined fixed system of axes, and a second distance between said first crane and said second crane;

(b) determining a first speed of said first crane in said fixed system of axes, and a second speed of said first crane relative to said second crane as a function of said first distance and said second distance in order to derive therefrom a third speed of said second crane in said fixed system of axes;

(c) estimating a first safety margin between said first crane and said second crane as a function of said second distance and said first speed and said third speed;

(d) comparing said first safety margin to at least a first predetermined threshold in order to produce a first collision risk factor; and (e) controlling the drive means of said first crane as a function of a sign of at least one of said first speed, second speed and third speed and as a function of said first collision risk factor in order to prevent a collision between said first crane and said second crane.

2. The method as recited in claim 1, wherein said estimating step comprises:

(1) calculating a first stopping distance of said first crane as a function of said first speed and a predetermined deceleration of said first crane, and a second stopping distance of said second crane as a function of said third speed and a predetermined deceleration of said second crane; and (2) calculating said first safety margin as a function of said second distance and said first stopping distance and second stopping distance.

3. The method as defined in claim 1, and further including:

(f) checking the coherence of a variable equal to one of said first distance, said second distance, said first speed, and said second speed, comprising:

(1) carrying out at least one of first and second comparisons, said first comparison consisting in comparing the absolute value of said variable to a maximal value and said second comparison consisting in comparing a variable value difference between said variable and an earlier value of said variable with a minimal difference and a maximal difference;

(2) if said absolute value of said variable is less than said maximal value and said variable value difference lies between said minimal and maximal differences, incrementing a coherence count by one and deeming said variable to be coherent in subsequent steps of the method, a defect count being reset to zero if said coherence count is more than a minimal coherence count; and (3) if said absolute value of said variable is more than said maximal value or said variable value difference is less than said minimal difference or more than said maximal difference, incrementing said defect count by one and resetting said coherence count to zero, comparing said defect count to a maximal defect count in order to acquire said variable again if said defect count is less than said maximal defect count, and actuating said drive means if said defect count is more than said maximal defect count.

4. The method as defined in claim 1, and further including a third crane movable on said movement path on the opposite side of said first crane relation to said second crane; said method further comprising the steps of:

(f) measuring a third distance between said first crane and said third crane;

(g) determining a fourth speed of said first crane relation to said third crane as a function of said first distance and said third distance in order to derive there from a fifth speed of said third crane in said fixed system of axes;

(h) estimating a second safety margin between said first crane and said third crane as a function of said third distance, said first speed and said fifth speed; and (i) comparing said second safety margin to at least a second predetermined threshold in order to produce a second collision risk factor;

(j) said controlling step further depending on the sign of at least one of said fourth speed, said fifth speed, and said second collision risk factor.

5. Apparatus for preventing collisions between first and second movable cranes that are driven by respective drive means on a common movement path, comprising, relative to said first crane:

(a) first distance measuring means for measuring a first distance between said first crane and an origin of a predetermined fixed system of axes;

(b) second distance measuring means for measuring at least a second distance between said first crane and said second crane; and (c) central processing means connected with said first and said second distance measuring means for controlling the drive means of said first crane:

(1) as a function of at least one of:
(a) a first speed of said first crane in said fixed system of axes and a second speed of said first crane relative to said second crane which are determined as a function of said first distance and said second distance; and
(b) a third speed of said second crane in said fixed system of axes derived as a function of said first speed and said second speed; and (2) as a function of a first collision risk factor resulting in comparing a first safety margin between said first crane and said second crane which is estimated as a function of said second distance, said first speed, and said third speed, to at least a predetermined threshold, thereby to prevent a collision between said first and second cranes.

6. Apparatus as defined in claim 5, wherein said first distance measuring means comprises a laser range finder fixed to said first crane, and a reflector facing said range finder and fixed with respect to said fixed system of axes.

7. Apparatus as defined in claim 6, wherein said second distance measuring means comprises a laser range finder fixed to said first crane and a reflector facing said range finder fixed to said second crane.

* * * * *